United States Patent
Rao et al.

(10) Patent No.: US 11,887,486 B2
(45) Date of Patent: Jan. 30, 2024

(54) CONTEXT DRIVEN ALERTING

(71) Applicant: Rockwell Collins, Inc., Cedar Rapids, IA (US)

(72) Inventors: Arjun Harsha Rao, Marion, IA (US); Peggy Wu, Ellicott City, MD (US); Christopher L George, Winchester, VA (US); Timothy J. Wittkop, Marion, IA (US); Michael P. Matessa, Ben Lomond, CA (US); Wade T. Johnson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/744,357

(22) Filed: May 13, 2022

(65) Prior Publication Data
US 2022/0392354 A1  Dec. 8, 2022

Related U.S. Application Data

(60) Provisional application No. 63/196,906, filed on Jun. 4, 2021.

(51) Int. Cl.
| | |
|---|---|
| G08G 5/00 | (2006.01) |
| G06V 40/16 | (2022.01) |
| G06V 40/10 | (2022.01) |
| G06V 40/18 | (2022.01) |
| G06V 40/70 | (2022.01) |
| G10L 25/66 | (2013.01) |

(52) U.S. Cl.
CPC .......... *G08G 5/0021* (2013.01); *G06V 40/15* (2022.01); *G06V 40/174* (2022.01); *G06V 40/18* (2022.01); *G06V 40/70* (2022.01); *G10L 25/66* (2013.01)

(58) Field of Classification Search
CPC .... G08G 5/0021; G06V 40/174; G06V 40/15; G06V 40/18; G06V 40/70; G10L 25/66
USPC ........................................................ 340/963
See application file for complete search history.

(56) References Cited

U.S. PATENT DOCUMENTS

| | | |
|---|---|---|
| 5,710,559 A | 1/1998 | Krogmann |
| 5,798,695 A | 8/1998 | Metalis et al. |

(Continued)

FOREIGN PATENT DOCUMENTS

| | | |
|---|---|---|
| GB | 2564864 A | 1/2019 |
| GB | 2579655 A | 7/2020 |
| WO | 2005023112 A1 | 3/2005 |

OTHER PUBLICATIONS

Extended European Search Report in European Application No. 22177006.8 dated Oct. 31, 2022, 8 pages.

*Primary Examiner* — Kerri L McNally
(74) *Attorney, Agent, or Firm* — Suiter Swantz pc llo

(57) ABSTRACT

A context driven alerting system and method is described in accordance with one or more embodiments of the present disclosure. The alerting system and method may consider a pilot's physiological, psychological, and behavioral state during a given mission context. The system may include biometric information which is fused with a context of the flight. The context may be based on one or more of a mission profile data or an aircraft state data. The fused data may be time synchronized and provided to an alerting algorithm. The alerting algorithm may then provide an alert to the pilot which includes a priority, intensity, frequency, or modality determined based on the fused information.

12 Claims, 7 Drawing Sheets

(56) References Cited

U.S. PATENT DOCUMENTS

| | | | |
|---|---|---|---|
| 10,065,658 B2 | 9/2018 | Deligianni et al. | |
| 10,102,773 B2 | 10/2018 | Towers et al. | |
| 10,127,810 B2 | 11/2018 | Durie, Jr. et al. | |
| 10,471,963 B2 | 11/2019 | Huang et al. | |
| 10,756,808 B1 * | 8/2020 | Shen | G06V 40/70 |
| 2014/0072136 A1 * | 3/2014 | Tenenbaum | G08B 21/06 |
| | | | 381/74 |
| 2016/0242691 A1 | 8/2016 | Kranz et al. | |
| 2018/0307927 A1 * | 10/2018 | Hutchinson | G06V 20/46 |
| 2019/0080802 A1 * | 3/2019 | Ziobro | G16H 40/63 |
| 2019/0092337 A1 | 3/2019 | Chua et al. | |
| 2020/0183382 A1 * | 6/2020 | Schwindt | B64D 43/00 |
| 2021/0031940 A1 * | 2/2021 | Guida | B64C 15/00 |
| 2021/0034053 A1 * | 2/2021 | Nikolic | G08G 5/025 |

\* cited by examiner

300

CONTEXT DRIVEN ALERTING

CROSS-REFERENCE TO RELATED APPLICATIONS

The present application claims the benefit under 35 U.S.C. Section 119(e) of U.S. Provisional Application No. 63/196,906, filed Jun. 4, 2021, which is incorporated herein by reference in the entirety.

TECHNICAL FIELD

The present disclosure generally relates to methods and systems for alarms and more particularly to alarms responsive to undesired or abnormal pilot state.

BACKGROUND

Alerts on the flight-deck may be triggered when the threshold for a particular parameter or set of parameters is violated, such as airspeed or altitude. However, such alerts do not account for the physiological, cognitive, or behavioral state of the pilot. Therefore, it would be advantageous to provide a device, system, and method that cures the shortcomings described above.

SUMMARY

A system is described, in accordance with one or more embodiments of the present disclosure. In one illustrative embodiment, the system includes one or more biometric sensors configured to capture biometric data of a pilot within a flight deck of an aircraft. In another illustrative embodiment, the biometric data is time variant and indicates a state of the pilot. In another illustrative embodiment, the biometric data includes at least one of video-based biometric data, audio-based biometric data, or wearables-based biometric data. In another illustrative embodiment, the system includes a non-transitory memory maintaining program instructions. In another illustrative embodiment, the system includes one or more processors configured to execute the program instructions maintained on the memory. In another illustrative embodiment, the program instructions cause the one or more processors to receive the biometric data, an aircraft state data, and a mission profile data. In another illustrative embodiment, the program instructions cause the one or more processors to perform data fusion on the biometric data, the aircraft state data, and the mission profile data to generate fused information with a common timestamp. In another illustrative embodiment, the program instructions cause the one or more processors to apply an alerting algorithm to the fused information to determine an alert. In another illustrative embodiment, the alert includes at least one of an alert priority, an alert intensity, an alert frequency, or an alert modality which is based on the fused information. In another illustrative embodiment, the program instructions cause the one or more processors to provide the alert to an aircraft avionics system.

A method is described, in accordance with one or more embodiments of the present disclosure. In one illustrative embodiment, the method includes receiving biometric data, aircraft state data, and mission profile data. In another illustrative embodiment, the biometric data is of a pilot within a flight deck and is captured by one or more biometric sensors. In another illustrative embodiment, the biometric data indicates a state of the pilot. In another illustrative embodiment, the biometric data includes at least one of video-based biometric data, audio-based biometric data, or wearables-based biometric data. In another illustrative embodiment, the method includes performing data fusion on the biometric data, the aircraft state data, and the mission profile data to generate fused information with a common timestamp. In another illustrative embodiment, the method includes applying an alerting algorithm to the fused information to determine an alert. In another illustrative embodiment, the alert includes at least one of an alert priority, an alert intensity, an alert frequency, or an alert modality which is based on the fused information. In another illustrative embodiment, the method includes providing the alert to the pilot by an aircraft avionics system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
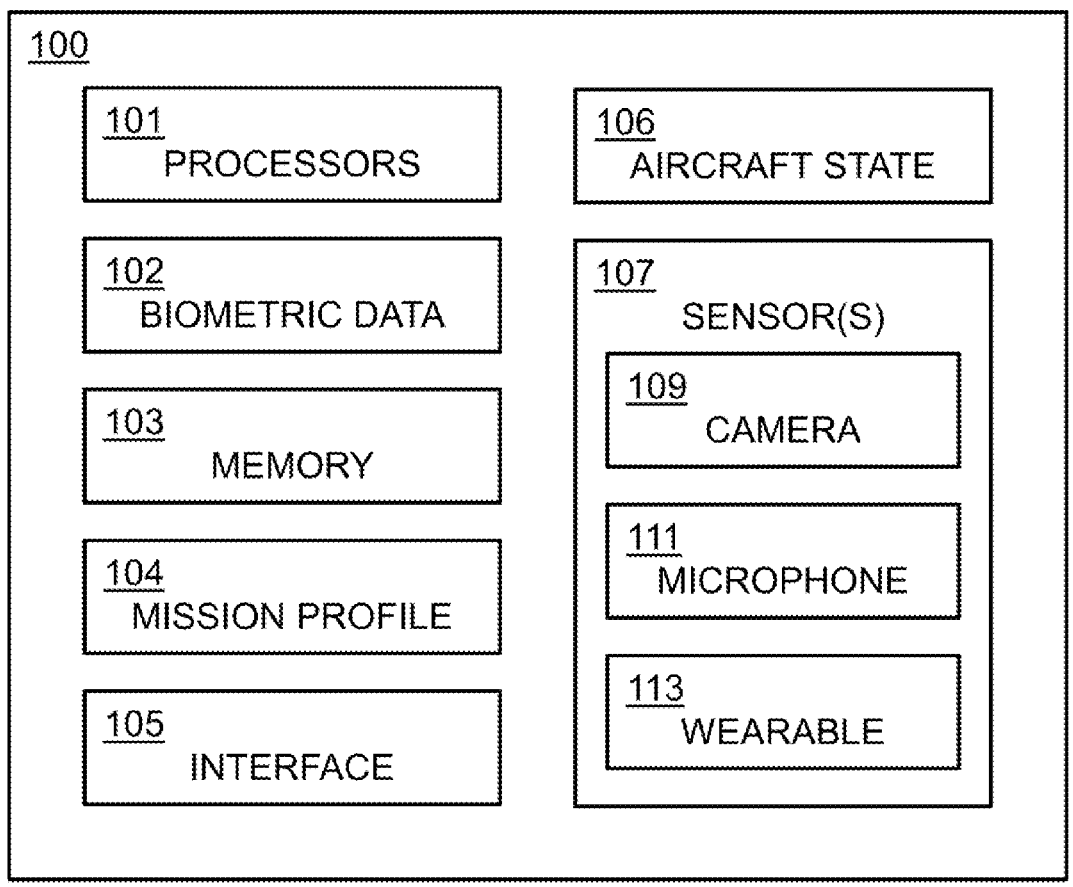
FIG. 1A depicts a simplified block diagram of an alerting system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Broadly embodiments of the present disclosure are directed to a system and a method for generating context driven alerts. The alerts may be generated taking into account the flight context, such as, the current phase of flight. The alerts may also be generating taking into account the state of the pilot, such as, but not limited to, a workload, an alertness level, or a fatigue level. The context driven alerts may be generated based on information received from one or more systems.

Referring generally to FIGS. 1A-1E, a system 100 for alerting a pilot, in accordance with one or more embodiments of the present disclosure. The system 100 may also be referred to as an alerting system. The system 100 may be utilized in a flight deck of an aircraft. The system 100 may consider a pilot's physiological, psychological, and behavioral state during a given mission context. The system 100 may leverage data from multiple sources to provide context-driven alerts to a pilot. The system 100 may mitigate increased workload caused by multiple independent alerts, while facilitating improved pilot situational awareness. Furthermore, the system 100 may interface with an aircraft avionics system. By interfacing with the aircraft avionics, the system 100 may provide the alert to the pilot. Based upon the alert, the pilot may regain or have an improved situational awareness.

Referring now to FIG. 1A, a simplified schematic diagram of the system 100 is described. The system 100 may include one or more processors 101, memory 103, network interface 105, biometric sensor 107, and the like. The processors 101 may generally be configured to receive various information and execute one or more program instructions for alerting a pilot. The processors 101 may receive information from various data sources by way of the network interface 105. The data sources may include, but are not limited to, one or more biometric sensors 107 that monitor biometric data 102 of a pilot's physiological, psychological, and behavioral state, aircraft sensors that capture aircraft state data 106 about the aircraft, and/or mission profile sensors that monitor mission profile data 104, such as a (e.g., flight plan). The processors 101 may collect time series data from such sources and stored the time series data in the memory 103. The processors 101 may then fuse the time series data. The fused time series data may then serve as an input to an alerting algorithm. The processors 101 may then execute an alerting algorithm based on the time series data. The alerting algorithm may generate an alert to be provided to a pilot by way of an aircraft avionics system. The generated alert may include one or more of prioritization, intensity, frequency, or modality.

In embodiments, the system 100 may include the processor 101 and the memory 103. The memory 103 may maintain program instructions which may be executed by the processor. By executing the program instructions, the processor 101 may execute any of the various process steps described throughout the present disclosure, such as detection abnormal behavior.

For the purposes of the present disclosure, the term processor 101 or "processing element" may be broadly defined to encompass any device having one or more processing or logic elements (e.g., one or more microprocessor devices, one or more application specific integrated circuit (ASIC) devices, one or more field programmable gate arrays (FPGAs), one or more digital signal processors (DSPs)), a special purpose logic device (e.g., ASICs)), or other integrated formats. In this sense, the one or more processors may include any device configured to execute algorithms and/or instructions (e.g., program instructions stored in memory). Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure, such as, but not limited to, the method described herein, may be carried out by the processors 101.

For the purposes of the present disclosure, the memory 103 may include any storage medium known in the art suitable for storing program instructions executable by the associated processor. For example, the memory medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory medium may be housed in a common controller housing with the processor. For example, the memory and the processor may be housed in a line replaceable unit, an integrated modular avionics (IMA) controller, or the like. In an alternative embodiment, the memory may be located remotely with respect to the physical location of the processor. In another embodiment, the memory maintains program instructions for causing the processor(s) to carry out the various steps described through the present disclosure.

In some embodiments, the processor 101 is configured to receive the information from a network interface 105. The network interface 105 may include any standard interface, such as, but not limited to, ARINC 429, ARINC-664, ethernet, AFDX, serial, CAN, TTP, Military Standard (MIL-STD) 1553, peripheral component interconnect (PCI) express, digital interfaces, analog interfaces, discrete interfaces, or the like. The network interface 105 may include any wireline communication protocol (e.g., DSL-based interconnection, cable-based interconnection, T9-based interconnection, and the like) or wireless communication protocol (e.g., GSM, GPRS, CDMA, EV-DO, EDGE, WiMAX, 3G, 4G, 4G LTE, 5G, Wi-Fi protocols, RF, Bluetooth, and the like) known in the art. By the network interface 105, the processor may be configured to receive information from one or more systems, such as, but not limited to, the biometric sensor 107, the mission profile data 104, or the aircraft state data 106. The mission profile data 104 and the aircraft state data 106 may be received from one or more avionics systems. During flight, the processors 101 may receive information (e.g., by way of the network interface 105). For example, the processors 101 may receive a video stream from the camera 109, an audio recording from the microphone 111, and various sensor data from the wearable device 113. The processors 101 may then analyze the video stream, the audio recording, and the various sensor data. It is further contemplated that the video stream, the audio recording, and the wearable data may be preprocessed prior to the processors 101 such data, such that the processors 101 merely receive biometric data determined from the video stream, the audio recording, or the wearable data.

In embodiments, the biometric sensors 107 includes one or more of a camera 109, a microphone 111, or a wearable device 113.

The camera 109 is described, in accordance with one or more embodiments. The camera 109 may include any suitable camera. For example, the camera 109 may include various mechanical or electrical components for capturing an image or an image stream associated with the pilot. The camera 109 may capture a stream of images of the user within the flight deck. The camera 109 may be communicatively coupled to the processors 101. For example, the camera 109 may be communicatively coupled to the processors 101 by way of the network interface 105. The camera 109 may thus provide the stream of images to the processors 101. The camera 109 may be disposed in a number of locations within the aircraft system 100, such as, but not limited to, within a head-mounted display or coupled to the flight deck of the cockpit. In embodiments, the stream of images captured by the camera 109 includes one or more of an eye of the user gazing at various locations within the flight deck, a facial expression of the user, a pose (e.g., a position and orientation) of the user, or an interaction of the user with the various instruments and displays within the flight deck. The camera 109 may be positioned and oriented to capture one or more of the eye, the facial expression, the gaze, or the aircraft interactions during operation of the aircraft.

The microphone 111 is now described, in accordance with one or more embodiments of the present disclosure. The microphone 111 may capture an audio recording of a voice of the pilot. The audio recording may then be provided to the processors 101. In embodiments, the processors 101 are configured to perform voice recognition system on the audio recording to determine auditory information, such as recognizing words or phrases uttered by the pilot. In embodiments, the processors 101 are configured to perform speech recognition on the audio recording to identify patterns of speech within the phrases spoken by the user. In some instances, the camera 109 and the microphone 111 may be housed in common housing.

The wearables device 113 is now described, in accordance with one or more embodiments of the present disclosure. The wearable device 113 may include any pilot wearable device, such as, but not limited to, Electroencephalograms (EEG), Electrocardiograph (ECG), pulse sensor, oxygen sensor, galvanic skin response (GSR), or any other biometric data sensing device. It is further contemplated that the system 100 may include any number of the wearable devices 113.

Figure 1B:
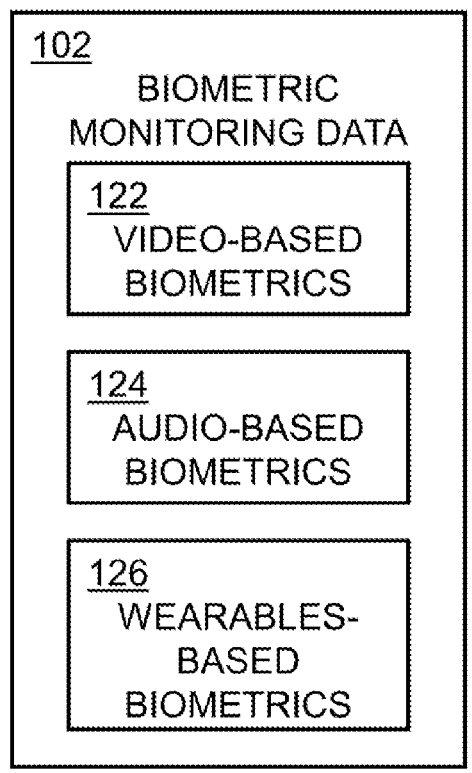
FIG. 1B depicts biometric monitoring data, in accordance with one or more embodiments of the present disclosure.

In embodiments, the system 100 receives biometric monitoring data 102. As depicted in FIG. 1B, the biometric monitoring data 102 may include one or more of video-based biometric data 122, audio-based biometric data 124, or wearables-based biometric data 126. The video-based biometric data 122 may be received from the camera 109. The audio-based biometric data 124 may be received from the microphone 111. The wearables-based biometric data may be received from the wearable device 113.

The video-based biometric data 122 may include, but is not limited to, a facial expression of the pilot determined from the stream of images captured by the camera 109. The facial expression may be determined by applying a facial expression recognition algorithm to the stream of images. The facial expression algorithm may generally include any algorithm for detecting the facial expression. In embodiments, the processors 101 performs the facial expression algorithm, although this is not intended to be limiting. The video-based biometric data 122 may also include, but is not limited to, a gaze where the pilot is looking at a given time. The gaze may be determined by a gaze detection algorithm performed on the stream of images received from the camera 109. The gaze detection algorithm may generally include any algorithm for detecting the gaze. In embodiments, the processors 101 performs the gaze detection algorithm, although this is not intended to be limiting. The video-based biometric data 122 may further indicate facial or pose changes over time. The biometric monitoring data 102 may thus include eye tracking data, posture data, facial features/expressions, and the like.

The biometric monitoring data 102 may also include, but is not limited to, audio-based biometric data 124. For example, the audio-based biometric data 124 may include, but is not limited to, auditory information determined from audio recordings captured by the microphone 111. The auditory information may indicate who is speaking. The auditory information may be determined by applying a voice recognition algorithm to the audio recordings. The voice recognition algorithm may generally include any algorithm for detecting the auditory information. In embodiments, the processors 101 performs the voice recognition algorithm, although this is not intended to be limiting. By way of another example, the audio-based biometric data 124 may include, but is not limited to, speech patterns determined from the audio recordings captured by the microphone 111. The speech patterns may include, but are not limited to, phonetic or morphological patterns particular to a pilot. For example, the phonetic patterns may indicate how the speech of the pilot sounds. By way of another example, the morphological patterns may indicate the word structure such as the affixes or morphemes used by the pilot, parts of speech, and the like. The speech patterns may be determined by applying an audio pattern recognition algorithm to the audio recordings. The audio pattern recognition algorithm may generally include any algorithm for detecting the speech pattern. In embodiments, the processors 101 performs the audio pattern recognition algorithm, although this is not intended to be limiting.

The biometric monitoring data 102 may also include, but is not limited to, wearables-based biometric data 124. The biometric monitoring data 102 may be determined by the biometric sensors 107 which are configured to be worn by the pilot. For example, the wearables-based biometric data 126 may include, but is not limited to, biometric information received from the wearable device 113. The wearables-based biometric data 126 may include, but is not limited to, Electroencephalograms (EEG) sensor data, Electrocardiograph (ECG) sensor data, pulse sensor data, oxygen sensor data, galvanic skin response (GSR) sensor data, and the like.

In the context of the system 100 in commercial aircraft, the biometric monitoring data 102 may include, but is not limited to, data received from a dashboard mounted eye tracking system optionally including a microphone. The dashboard mounted eye tracking system may be preferred by the pilot due to the non-invasive nature (e.g., no sensor coupled to the pilot). In the context of non-commercial aircraft such as military aircraft, the biometric monitoring data 102 may additionally or alternatively include the wearable devices 113 coupled to the pilot (e.g., invasive sensors). For example, the sensors coupled to the pilot may include, but are not limited to, a chest strap (e.g., heat rate, respiration, blood oxygenation, etc.), an Electroencephalogram (EEG) sensor, an embedded eye tracking in a helmet, and the like. It is further contemplated that the commercial aircraft may include the wearables-based biometric data. However, commercial aircraft pilots may resist the use of such sensors.

In some embodiments, the system 100 receives biometric monitoring data 102 which is time variant. Time variant information from one or more of such video-based biometric data 122, audio-based biometric data 124, or wearables-based biometric data 126 may indicate a state of the pilot over time. The state may include, but is not limited to, a physiological state (e.g., a normal operating state, a stressed state, a fatigued state, etc.), a psychological state (e.g., high workload), or a pathological state of the pilot. In this regard, a state of the pilot may change over time. In particular, the state of the pilot is expected to change between flight phases. During a takeoff phase or landing phase the pilot may experience significantly high stress and workload, such that the state of the pilot may similarly be more agitated. During a cruise phase, the pilot may experience significantly less stress and workload. Thus, the various phases may affect the state (e.g., physiological state, psychological state, or pathological state) of the pilot. Depending upon the current state, the pilot may react in a different manner (e.g., a delayed reaction time during a high stress situation). Therefore, an ability to tailor alerts to the pilot based upon the pilot's current biometric information is desirable.

In embodiments, the system 100 may be configured to receive mission profile data 104 and/or aircraft state data 106. The mission profile data 104 and aircraft state data 106 may be received from one or more avionics systems.

Figure 1C:
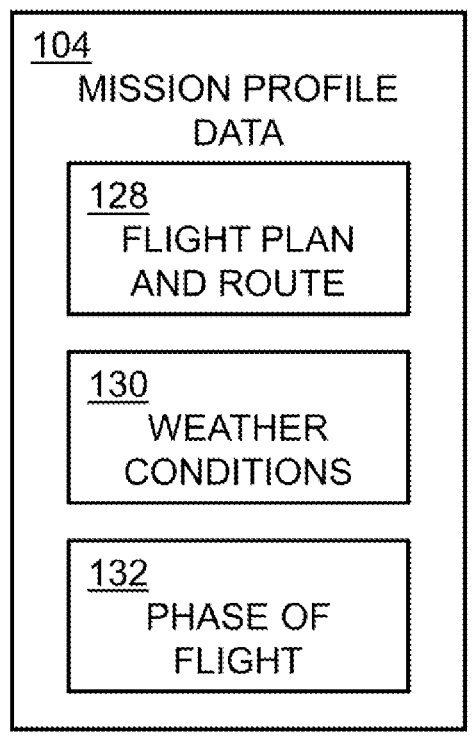
FIG. 1C depicts mission profile data, in accordance with one or more embodiments of the present disclosure.

As depicted in FIG. 1C, the system 100 receives mission profile data 104. The mission profile data 104 may provide a context of the flight. The context of the flight is relevant in determining what kind of alerts should be provided. The mission profile data 104 may include, but is not limited to, a filed flight plan and current route 128, prevalent weather condition 130, phase of flight 132, and the like. The filed flight plan may include a planned path to be flown by the aircraft. The current route may indicate a current route taken by the aircraft, which may diverge or be consistent with the flight plan. The prevalent weather condition 130 may indicate any weather conditions which the aircraft is experiencing, such as, but not limited to, lighting, rain, snow, fog, clear weather, sun, and the like. The phase of flight 132 may include indicate a current phase of the aircraft, such as, but not limited to, a take-off state, a taxi state, a cruise state, or a landing state.

In embodiments, the alert provided to the pilot may be adjusted according to the mission profile data 104. For example, the system 100 may adjust the alerts when the current route diverges from the flight plan. By way of another example, the system 100 may adjust the alerts according to the prevalent weather conditions 130. By way of another example, the system 100 may adjust the alerts as the phase of flight 132 changes. Alerts provided while in cruise may be different than alerts provided while in approach. For instance, an alert priority may be heighted as the aircraft changes from cruise to landing.

Figure 1D:
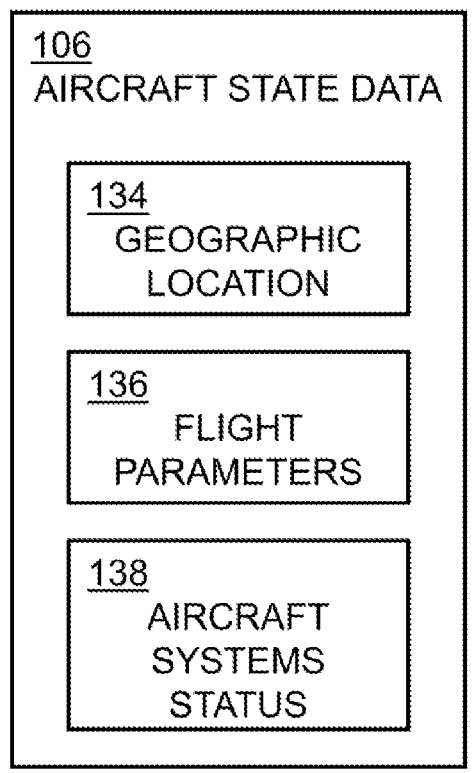
FIG. 1D depicts aircraft state data, in accordance with one or more embodiments of the present disclosure.

As depicted in FIG. 1D, the system 100 receives aircraft state data 106. Similar to the mission profile data 104, the aircraft state data 106 may be used to determine context for the flight which may then be used to adjust the alerts provided to the pilot. The aircraft state data 106 may include one or more of geographic location information 134, flight parameters 136, or aircraft systems status 138. For example, the geographic location information 134 may include any global navigational satellite system (GNSS) information known in the art, such as, but not limited to, global positioning system (GPS) information, global orbiting navigational satellite system (GLONASS) information, Galileo information, or BeiDou-2 information. By way of another example, the flight parameters 136 may include, but are not limited to, attitude data, altitude data, airspeed data, navigation data, or fuel data. By way of another example, the aircraft systems status 138 may include, but is not limited to, power generation stability and control, surveillance system, navigation system, structural protection, or cabin environment. The aircraft state data 106 may be used to determine there is anomalous aircraft state data. If anomalous aircraft state data is not being corrected by the pilot, then something is not ok and an alert may be provided.

In embodiments, the alert provided to the pilot may be adjusted according to the aircraft state data 106. For example, the system 100 may adjust the alerts when the geographic location information 134 indicates the aircraft is approaching a no-fly zone. By way of another example, the system 100 may adjust the alerts when the flight parameters 136 fall below a threshold. By way of another example, the system 100 may adjust the alerts when the aircraft system status 138 indicates a failure in one of the power generation stability and control, surveillance system, navigation system, structural protection, or cabin environment.

Figure 1E:
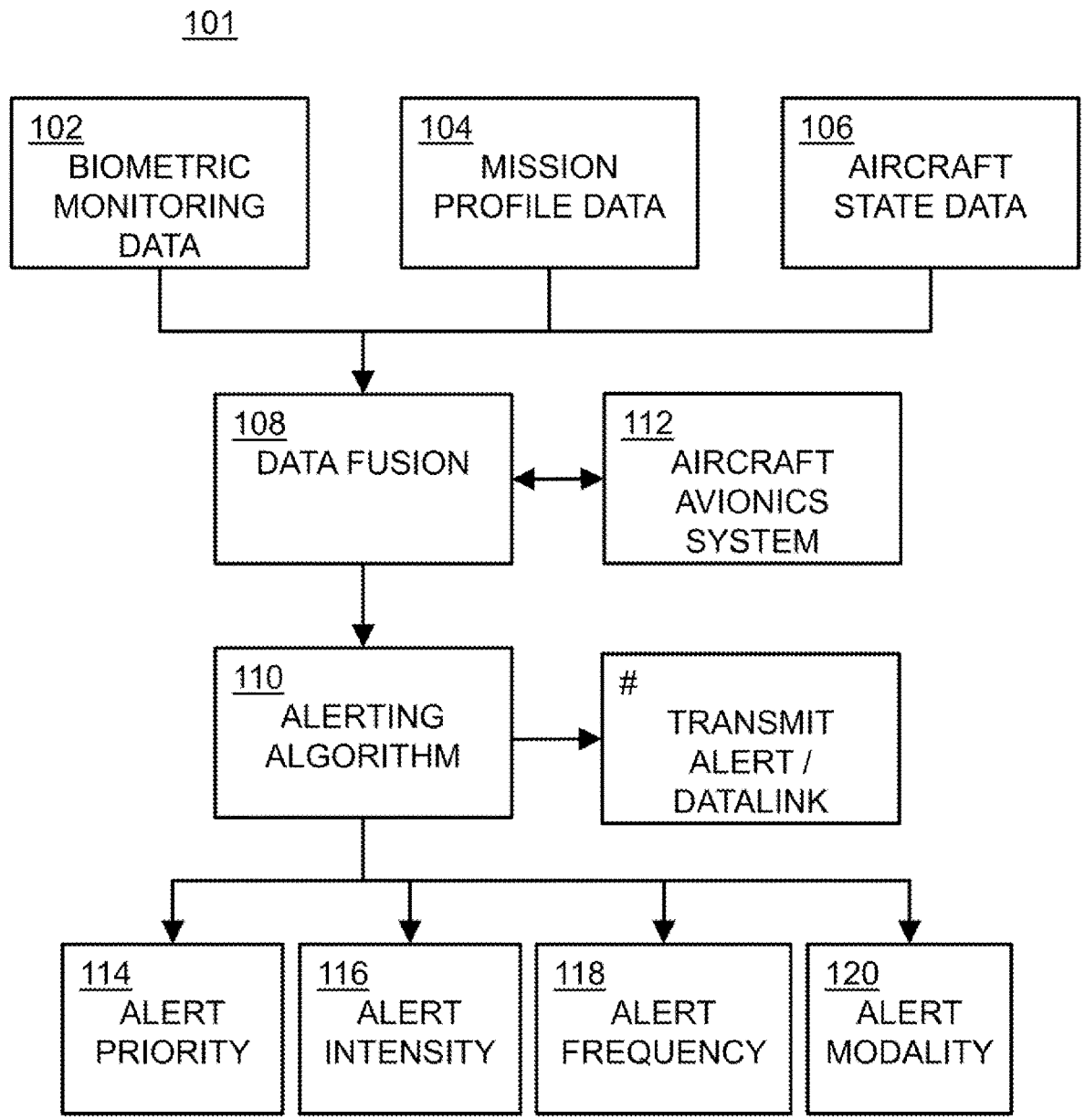
FIG. 1E depicts one or more process flows of a processor, in accordance with one or more embodiments of the present disclosure.

Referring now to FIG. 1E, one or more processing streams of the processors 101 are described. The processors 101 may receive information from one or more sources. Such information may include, but is not limited to, information from the camera 109, microphone 111, wearable device 113, or the aircraft avionics system 112. For example, the information may include the biometric monitoring data 102, the mission profile data 104, the aircraft state data 106, data from an aircraft avionics system 112, and the like. The processors 101 may receive the information by way of one or more the network interfaces 105. The processors 101 may then use one or more of the biometric monitoring data 102, the mission profile data 104, the aircraft state data 106, or the data from the aircraft avionics system 112 to determine an alert for the pilot. The data from the aircraft avionics system 112 may include flight deck interactions, which may indicate how the pilot is interacting with the avionics system and flight deck.

Data fusion 108 may be performed on the received information. For example, one or more of the biometric monitoring data 102, the mission profile data 104, the aircraft state data 106, or the data from the aircraft avionics system 112 may be fused. By performing data fusion, data from multiple sources may be integrated to provide fused information. The fused information may include one or more of a common filetype, a common unit, an improved data quality, and the like. The data fusion 108 may include bringing together all the data for processing. Data fusion 108 may generally include one or more steps of preprocessing, such as, but not limited to may include making sure the sequencing is correct, making sure the timestamps are synchronized, determine and remove outliers, and the like. The fused data may then be provided to alerting logic. The data fusion 108 may also be referred to as preprocessing, checking, reasoning, and then providing to the alerting algorithm.

The data received by the processor 101 may be time series data. During the data fusion 108, the various data may be timestamped and associated with data received at a similar time. In this regard, one or more of the video-based biometric data 122, the audio-based biometric data 124, the wearables-based biometric data 126, the filed flight plan and current route 128, the prevalent weather condition 130, the phase of flight 132, the geographic location information 134, the flight parameters 136, the aircraft systems status 138, and the like may be fused with a common timestamp. For example, the bioinformation information may be associated with the current flight state or the weather information. The data fusion may include any suitable data fusion procedure, such as, but not limited to extract, transform, and load (ETL). The data fusion 108 may thus include making sure that the data received from the various sensors are processed and aligned with a system clock (e.g., aircraft clock). For instance, a first biometric data stream may be received with a first sampling rate at a first frequency, a second biometric data stream may be received with at a second sampling rate at a second frequency, and the aircraft state data may be coming in at a third sampling rate at a third frequency.

In embodiments, the data fusion 108 may also include one or more steps of outlier detection. The data fusion 108 may include one or more methods for detecting and removing outliers from the data. The outlier detection may generally include any number of statistical methods. For example, the sensor data may indicate a face of the pilot has not been detected for a second but the seat sensor may indicate the pilot is currently seated. In this example, one of the cameras 109 or a facial detection algorithm has failed. The facial detection data may be ignored while the seat sensor continues to detect the pilot. Ignoring the facial detection data my prevent the alerting algorithm from being provided with erroneous data. In the event the biometric sensors 107 fail, the outlier detection may determine the pilot is still operating the aircraft based on the buttons being pressed and other sensor data. The outliers may also be determined based on thresholds. For example, heartrate data outside of a nominal range may be applied to a threshold. Thus, the outliers may be determined from any number of heuristics driven based on a history of what is statistically unlikely given human physiology. By way of another example, excessive light in eye tracking may indicate the pilot is not found even if the seat sensor indicates the pilot is sitting in the seat.

The fused information may then be provided to an alerting algorithm 108 executable by the processors 101. The alerting algorithm 110 may include any suitable algorithm. The alerting algorithm 110 may take the fused data and make a determination of what is going on in the flight deck.

The alerting algorithm 110 may include context-based reasoning. The alerting algorithm 110 may receive the fused data and look at the fused data given the context of the flight. For example, the flight may be in cruise, the aircraft parameters are nominal, however the biometric data suggests the pilot is fatigued. The mission profile data may further indicate the aircraft is fifteen minutes away from a waypoint in which the pilot needs to check in with air traffic control. The alerting algorithm may determine whether the pilot has been previously fatigued. If this is the first instance of fatigue, the alerting algorithm 110 may cause the aircraft avionics system 112 to raise a chime requesting pilot confirmation regarding a check in time. By way of another example, a pilot may close their eyes to prevent temporary eye blindness. The pilot may close one or more eyes. The system does not want to think the pilot fell asleep. When making a bank or a turn, sunlight may pass over the eyes of the pilot. The sunlight may cause an autonomous tendency to squint, even if the pilot is wearing sun glasses. The eye tracking system may detect the eye is closed and assume the pilot is fatigued. However, the eye of the pilot is not closed due to fatigue but rather due to the sun, in the given context. Therefore, it is desirable to determine the context of the flight, such as because of environmental factors, phases of flight, or the like. By way of another example, if for a given flight context the pilot is only looking at the primary flight display while the pilot should be performing a scan pattern and doesn't perform the scan pattern for a given amount of time, an alert may be provided to the pilot. The alert may include prompting the pilot to ask if the pilot is ok and eliciting a response (as opposed to diagnosing if the pilot is fatigued or under a given workload).

The alerting algorithm 110 may also be time driven. For example, the alerting algorithm 110 may include how much time to provide before escalating the alert or in which a repeated fatigue episode is likely to appear. For instance, fatigue may appear. A three-minute window may be instituted. If the pilot exhibits further signs of fatigue during the three-minute window, an alert level may be raised to a caution. A five-minute window may then be instituted. If the pilot exhibits further signs of fatigue during the five-minute window after the caution, the caution may be raised to a warning. However, if the pilot begins to behave nominally, then the caution may be deescalated. In this regard, the alerting algorithm may follow a decision tree. It is contemplated that the alerting algorithm may be scaled based on the mission context. For example, the mission context may indicate a more immediate need for pilot action. Sometimes missing a check in is less important than missing a heading or altitude change.

The alerting algorithm 110 may also look for various biometric data indicating the pilot has reduced capability to fly. For example, the alerting algorithm 110 may look for fatigue, pain, incapacitation, characterizing attention on the flight deck, workload. The workload may be detected by one or more wearable sensors, cognitive battery tests, and the like.

In embodiments, the alerting algorithm 110 may be tailored based on the type of aircraft. For example, commercial aircraft may include different values for the alerting algorithm than military aircraft, due to the type of mission flown.

In embodiments, the alerting algorithm 108 may determine an alert should be provided, and further determines or more of an alert priority 114, an alert intensity 116, an alert frequency 118, or an alert modality 120 for the alert.

The alert priority 114 may indicate a priority for one or more alerts to be provided to the pilot. The alerts may be provided to the pilot in ascending or descending order according to the priority. Non-critical priorities may be delayed from alerting the pilot for a given time while critical priorities may be provided to the pilot immediately.

The alert intensity 116 may indicate an intensity of the alert provided to the pilot. For example, the intensity may include one or more of a sound intensity, a visual intensity, a haptic intensity, and the like. Thus, the intensity may also be related to the modality.

The alert frequency 118 may determine a frequency by which the alert is provided to the pilot. In some instances, the frequency may be related to the priority. For example, high priority alerts may also include a higher frequency of alerts, although this is not intended to be limiting.

The alert modality 120 may include one or more of visual modality, aural modality, or haptic modality. For instance, the visual modality may display information on a display unit to present the alert to the pilot. Such display unit may be provided to any suitable display, such as, but not limited to, primary flight display (PFD) or head-down display (HDD), a head-up display (HUD), a head-mounted display (HMD), a stand-by display, or a head-worn display (HWD). By way of another instance, the aural modality may include discrete sounds, tones, or verbal statements used to annunciate an alert. For instance, the haptic modality may include any haptic response such as but not limited to, vibratory response of a seat or a control yoke.

An exemplary embodiment for the alerts provided by the aircraft avionics system 112 is now described. The processors 101 may execute the alerting algorithm. The alerting algorithm may notice an unusual event based on the fused information of the biometric monitoring data 102, the mission profile data 104, or the aircraft state data 106. In one instance, the unusual event may be assigned a low priority. For example, an aircraft may be coming into land, dealing with traffic, with non-desirable weather, or the like. A fuel related alert may be determined to be minor. The alert may be non-mission critical to the pilot given the current context. Given the context, the system 100 may determine the pilot does not need to be provided with the fuel alert. In another instance, the unusual event may be assigned a high priority. Commonly, both crewmembers may be present in the flight deck during takeoff, climb, approach, descent, and landing. When a single pilot is present, the alert provided may be different. The alerting algorithm 110 may determine the co-pilot is not present in the cockpit and cause the aircraft avionics system 112 to provide an alert to the pilot. The alerting algorithm 110 may additionally determine whether to hand over control of the aircraft to an autonomous agent or autopilot depending upon the context.

In embodiments, the alerting algorithm 110 may be coupled with the aircraft avionics system 112. Upon determining the alert, the alert may be provided to the aircraft avionics system 112. The aircraft avionics system 112 may then provide the alert to the pilot according to one or more of the alert priority 114, the alert intensity 116, the alert frequency 118, or the alert modality 120.

The one or more processors 101 may also be configured to transmit the alert by a datalink 140 to a location outside of the aircraft. The datalink 140 may be used to transmit what is going on in the flight deck. Particularly, in the military context if the pilot is experiencing a physiological context, such as fatigue, excessive workload, hypoxia, or the like, the system 100 may transmit the information to a wingman or a squadron leader. In the commercial context, the information may be transmitted to a commercial dispatch or the like.

Figure 2:
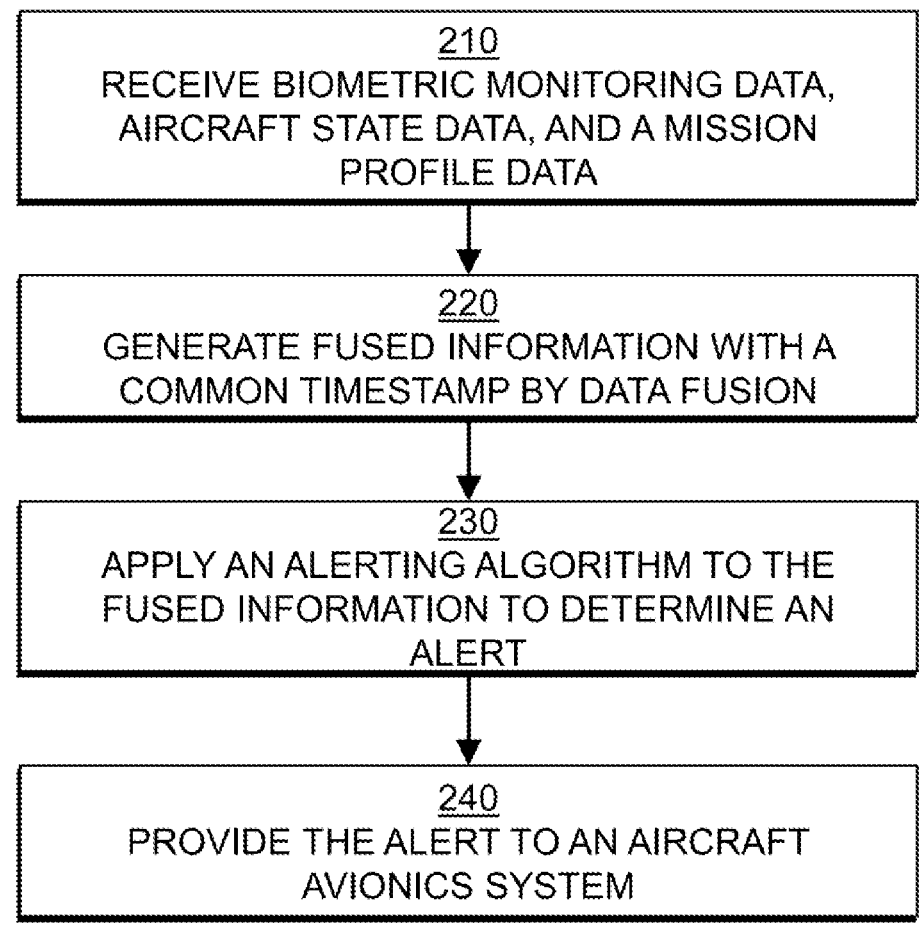
FIG. 2 depicts a flow-diagram of a method, in accordance with one or more embodiments of the present disclosure.

Referring now to FIG. 2 an alerting method 200 is described, in accordance with one or more embodiments of the present disclosure. The embodiments and the enabling technologies described previously herein in the context of the system 100 should be interpreted to extend to the method 200. It is further recognized, however, that the method 200 is not limited to the system 100.

In a step 210, information is received from a network. The information may include biometric monitoring data, aircraft state data, and a mission profile data. The biometric data may be of a pilot within a flight deck and may be captured by one or more biometric sensors within the flight deck. The biometric data may further indicate a state of the pilot which may be beneficial in determining an alert in the given context. The biometric data may include at least one of video-based biometric data, audio-based biometric data, or wearables-based biometric data. The aircraft state data may include one or more of a geographic location, a flight parameter, or an aircraft systems status. The flight parameter may include one or more of attitude data, altitude data, airspeed data, navigation data, or fuel data. The mission profile data may include one or more of a filed flight plan and current route, a weather condition, or a phase of flight.

In a step 220, the received information is fused to generate fused information with a common timestamp. The received information may be fused by performing data fusion by a processor on the biometric data, the aircraft state data, and the mission profile data to generate the fused information.

In a step 230, an alert is determined. The alert may be determined by applying an alerting algorithm to the fused information. The alert may include one or more of an alert priority, an alert intensity, an alert frequency, or an alert modality. The alert modality may include one or more of a visual modality, an aural modality, or a haptic modality which is based on the fused information. In this regard, the alert may be based on the context of one or more of the biometric data, the aircraft state data, or the mission profile data.

In a step 240, the alert is provided to the pilot by way of an aircraft avionics system.

The method described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory. It is further contemplated that each of the embodiments of the method described above may include any other step(s) of any other method(s) described herein. In addition, each of the embodiments of the method described above may be performed by any of the systems described herein. It is to be noted that the specific order of steps in the foregoing disclosed methods are examples of exemplary approaches. Based upon design preferences, it is understood that the specific order of steps in the method can be rearranged while remaining within the scope of the present disclosure.

Figure 3:
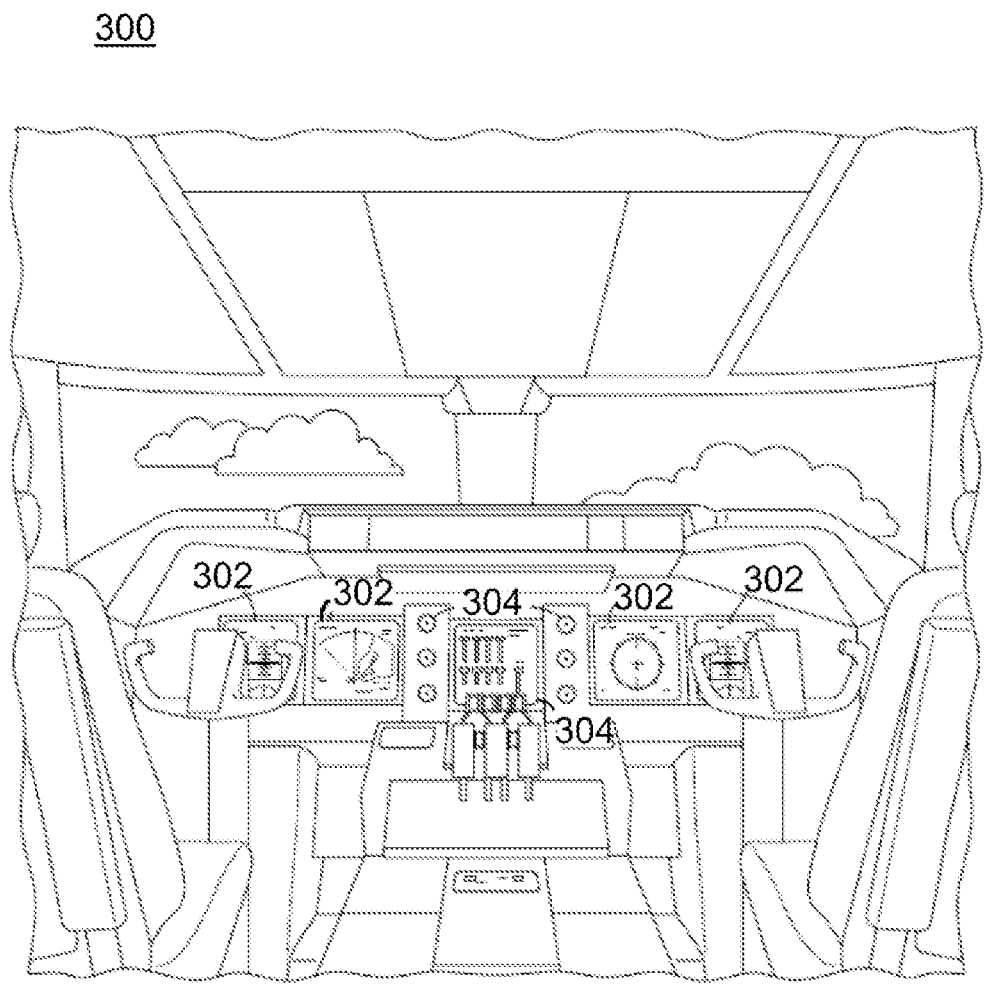
FIG. 3 depicts a perspective view of a flight deck of an aircraft, in accordance with one or more embodiments of the present disclosure.

Referring now to FIG. 3, a flight deck 300 of an aircraft is described, in accordance with one or more embodiments of the present disclosure. The system 100 may be embodied within the cockpit or flight deck 300. The system 100 may further include various components disposed outside of the flight deck 300, such as, but not limited to processing elements housed in a line replaceable unit (LRU), an integrated modular avionics (IMA) controller, or the like. The flight deck 300 may include an aircraft operator (not depicted), such as a pilot, a co-pilot, or a second officer seated within the cockpit. The flight deck 300 may also include one or more flight displays 302, aircraft instruments 304, and the like. The number and arrangement of the various elements within the flight deck 300 may be based on the type of the aircraft. Thus, the configuration of FIG. 3 is not intended to be limiting but is merely provided for exemplary purposes.

The flight deck 300 may include one or more flight displays 302. The flight displays 3 may be implemented using any of a variety of display technologies, including CRT, LCD, organic LED, dot matrix display, and others. The flight displays 302 may be configured to function to display various information known in the art. The flight displays 302 may be configured to function as one or more of a primary flight display (PFD) or a multifunction display (MFD). Such PFD and MFDs may be mounted in front of both a pilot and a copilot. The MFD may be mounted between the PFD of the pilot and the PFD of the copilot. Thus, the flight displays 302 may provide instrumentation for the operation of an aircraft. The flight displays 302 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays are contemplated and will be apparent to those skilled in the art.

The flight deck 300 may include one or more aircraft instruments 304. The aircraft instruments 304 may include, but are not limited to, left, center, right, overhead, second officer, or other aircraft instruments. The aircraft instruments 304 may be implemented using any of a variety of technologies, including CRT, LCD, organic LED, dot matrix display, and others. It is further contemplated that the aircraft instruments 304 of the flight deck 300 may include aircraft instruments (panels) which use analog indicators. The aircraft instruments 304 may indicate information associated with various flight instruments of the aircraft, such as, but not limited to, attitude, heading, vertical speed, air speed, altimeter, or turn. The aircraft instruments 304 may also indicate information associated with various engine instruments of the aircraft, such as, but not limited to, fuel quantity, oil quantity, oil pressure, oil temperature, tachometer, temperature, braking pressure, braking temperature, among others. The aircraft instruments 304 may also indicate information associated with various navigation instruments of the aircraft. Other types and functions of the aircraft instruments 304 are contemplated and will be apparent to those skilled in the art.

An operator (e.g., pilot, co-pilot or other cockpit crewmember) may be seated in a cockpit or like control space throughout one or more flight states of the aircraft, such as, but not limited to, pre-flight checks, taxiing, flight segments (e.g., takeoff, climb, cruise, descent, landing), and taxiing to a final destination before disembarkation, apart from short periods when the operator may not be in control of the aircraft (e.g., when another pilot or operator takes control so the operator may temporarily leave the cockpit). While seated in the flight deck 300, the operator may interact with or otherwise visually engage with various components of the cockpit, such as the flight display 302 or the aircraft instruments. During flight operations, a face of the operator may exhibit various facial expressions. The operator may also exhibit various poses during flight operations. The operator may also interact with (e.g., gaze or physically interact with) various components of the flight deck 300. The facial expressions, the pose, and the aircraft interactions may provide a biomarker of the behavior for the aircraft operator. The biomarker may be indicative of a fatigue, a stress, or the like, of the operator.

In embodiments, the camera 109 may be disposed within the flight deck 300 and oriented toward the operator. The camera 109 may be disposed in any suitable location of the flight deck 300. For example, the camera 109 may be mounted to the flight deck 300, coupled to a head mounted display, or the like. The camera 109 may be oriented for capturing a stream of images of the operator. The image stream may then be analyzed to detect a facial expression, gaze, or body pose of the operator within the stream of images. For example, the stream of images may capture frames of images as the operator interacts with cockpit interfaces (e.g., as the operator guides the aircraft through taxi, takeoff, and initial climb, scanning cockpit displays and windows throughout), tracking changes in the operator's facial expression, gaze, and body pose.

In a similar manner to the visual cues, the pilot may exhibit audio cues which indicate a fatigue, stress, or the like of the operator. For example, the pilot may speech with a given speech pattern (e.g., morphological or phonetic) indicating the pilot is stressed. In embodiments, the microphone 111 may be mounted in the flight deck for capturing audio of the operator.

Referring generally again to FIGS. 1A-3. The herein described system 100 illustrates different components contained within, or connected with, other components by the network. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved.

Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to wirelessly interactable and/or wirelessly interacting components and/or logically interacting and/or logically interactable components.

In example implementations, the concepts of the present disclosure may be incorporated in an aircraft. Using the concepts disclosed herein, flight anomalous behaviors may be detected. Although example embodiments of the present disclosure are shown and described in an aviation environment, the inventive concepts of the present disclosure may be configured to operate in any type of vehicle known in the art. In the interest of simplicity and to most clearly define the inventive concepts of the present disclosure, embodiments may be described throughout the present disclosure in an aircraft environment. However, these references are not to be regarded as limiting. Thus, references to "aircraft" or "aviation," and like terms should not be interpreted as a limitation on the present disclosure, unless noted otherwise herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
   one or more biometric sensors configured to capture biometric data of a pilot within a flight deck of an aircraft, wherein the biometric data is time variant and indicates a state of the pilot, wherein the biometric data includes at least one of video-based biometric data, audio-based biometric data, or wearables-based biometric data;
   a non-transitory memory maintaining program instructions; and
   one or more processors configured to execute the program instructions maintained on the memory, the program instructions causing the one or more processors to:
     receive the biometric data, aircraft state data, and mission profile data; wherein the aircraft state data includes at least one of a geographic location, a flight parameter, or an aircraft systems status; wherein the mission profile data includes at least one of a filed flight plan and current route, a weather condition, or a phase of flight;
     perform data fusion on the biometric data, the aircraft state data, and the mission profile data to generate fused information with a common timestamp; wherein the data fusion includes timestamping the video-based biometric data, the audio-based biometric data, the wearables-based biometric data, the filed flight plan and the current route, the weather condition, the phase of flight, the geographic location, the flight parameter, and the aircraft systems status;
     apply an alerting algorithm to the fused information to determine an alert, the alert including at least one of an alert priority, an alert intensity, an alert frequency, or an alert modality which is based on the fused information; and
     provide the alert to an aircraft avionics system for alerting the pilot.

2. The system of claim 1, wherein the one or more biometric sensors include a camera configured to capture a stream of images; wherein the biometric data includes the video-based biometric data.

3. The system of claim 2, wherein the video-based biometric data include a facial expression of the pilot determined from a facial expression recognition algorithm performed on the stream of images received from the camera.

4. The system of claim 2, wherein the video-based biometric data include a gaze of the pilot determined from a gaze detection algorithm performed on the stream of images received from the camera.

5. The system of claim 1, wherein the one or more biometric sensors include a microphone configured to capture an audio recording; wherein the biometric data includes the audio-based biometric data.

6. The system of claim 5, wherein the audio-based biometric data include auditory information determined from a voice recognition algorithm performed on the audio recording.

7. The system of claim 5, wherein the audio-based biometric data includes a speech pattern determined from an audio pattern recognition algorithm performed on the audio recording.

8. The system of claim 1, wherein the one or more biometric sensors include a wearable sensor configured to be worn by the pilot; wherein the biometric data includes the wearable-based biometric data; wherein the wearable sensor is at least one of an Electroencephalograms (EEG) sensor, an Electrocardiograph (ECG) sensor, a pulse sensor, an oxygen sensor, or a galvanic skin response (GSR) sensor.

9. The system of claim 1, wherein the flight parameter includes at least one of attitude data, altitude data, airspeed data, navigation data, or fuel data.

10. The system of claim 1, wherein the aircraft systems status includes at least one of a power generation data, a stability and control data, a surveillance system data, a navigation system data, a structural protection data, or a cabin environment data.

11. The system of claim 1, wherein the alert modality includes at least one of a visual modality, an aural modality, or a haptic modality.

12. A method comprising:
receiving biometric data, aircraft state data, and mission profile data, wherein the biometric data is of a pilot within a flight deck and is captured by one or more biometric sensors, wherein the biometric data indicates a state of the pilot, wherein the biometric data includes at least one of video-based biometric data, audio-based biometric data, or wearables-based biometric data; wherein the aircraft state data includes at least one of a geographic location, a flight parameter, or an aircraft systems status; wherein the mission profile data includes at least one of a filed flight plan and current route, a weather condition, or a phase of flight performing data fusion on the biometric data, the aircraft state data, and the mission profile data to generate fused information with a common timestamp; wherein the data fusion includes timestamping the video-based biometric data, the audio-based biometric data, the wearables-based biometric data, the filed flight plan and the current route, the weather condition, the phase of flight, the geographic location, the flight parameter, and the aircraft systems status;

applying an alerting algorithm to the fused information to determine an alert, the alert including at least one of an alert priority, an alert intensity, an alert frequency, or an alert modality which is based on the fused information; and providing the alert to the pilot by an aircraft avionics system.

* * * * *